United States Patent [19]
Holevas et al.

[11] Patent Number: 5,435,074
[45] Date of Patent: Jul. 25, 1995

[54] TAPE MEASURE AND MARKING DEVICE

[76] Inventors: Michael Holevas, 58-25 299th St., Bayside, N.Y. 11364; George Tsoungos, 22-55 45th St., Astoria, N.Y. 11103

[21] Appl. No.: 238,499

[22] Filed: May 5, 1994

[51] Int. Cl.⁶ .......................... B25H 7/00; G01B 3/10
[52] U.S. Cl. ......................................... 33/668; 33/669; 33/761; 33/767
[58] Field of Search ................. 33/668, 669, 761, 767, 33/768, 769, 720

[56] References Cited

U.S. PATENT DOCUMENTS

| | | | |
|---|---|---|---|
| 3,524,273 | 8/1970 | Shore | 33/761 |
| 3,526,964 | 9/1970 | Clark, Jr. | 33/761 |
| 3,713,603 | 1/1973 | Shore | 33/761 |
| 3,802,083 | 4/1974 | Freed | 33/668 |
| 4,760,648 | 8/1988 | Doak et al. | 33/668 |
| 4,964,225 | 10/1990 | Waldherr | 33/768 |
| 4,965,941 | 10/1990 | Agostinacci | 33/668 |
| 4,976,037 | 12/1990 | Hines | 33/668 |
| 5,172,486 | 12/1992 | Waldherr | 33/770 |

FOREIGN PATENT DOCUMENTS 1348499 12/1963 France .
1292770 10/1972 United Kingdom .

Primary Examiner—William A. Cuchlinski, Jr.
Assistant Examiner—G. Bradley Bennett
Attorney, Agent, or Firm—Collard & Roe

[57] ABSTRACT

The present invention is a tape measuring device having a main housing containing a coiled flexible measuring tape extendable from the front side of the housing. On the front side of the housing is a marker housing containing a marker. A locking mechanism, disposed on the front side of the housing, adjacent to the marker housing is linked to the marker and the scribe through a lever arm. Accordingly, when the locking mechanism is pressed down, the lever arm drives the marker outside the marker housing, exposing the tip of the marker. The user can then mark the measured material with the tip. Further movement of the locking mechanism will move it into a locked position whereby the tape is fixed after the user releases the locking mechanism. When the locking mechanism is returned to its original position, the tip moves back inside the housing to provide protection when not in use.

4 Claims, 2 Drawing Sheets

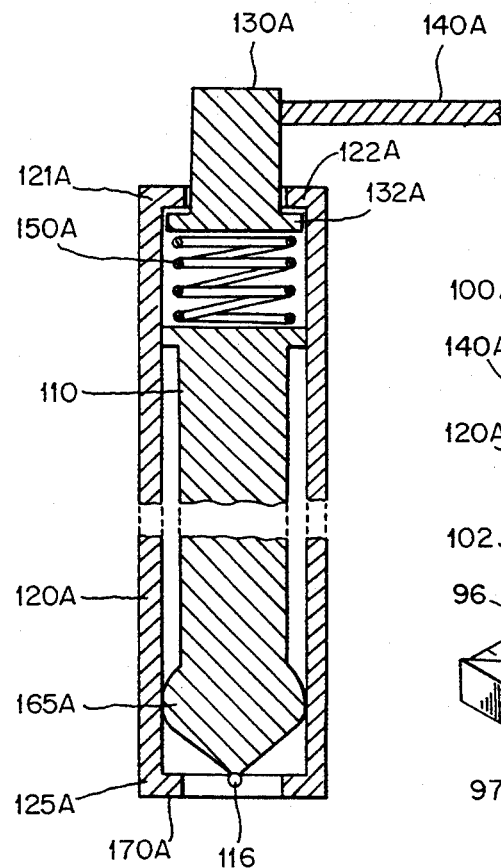
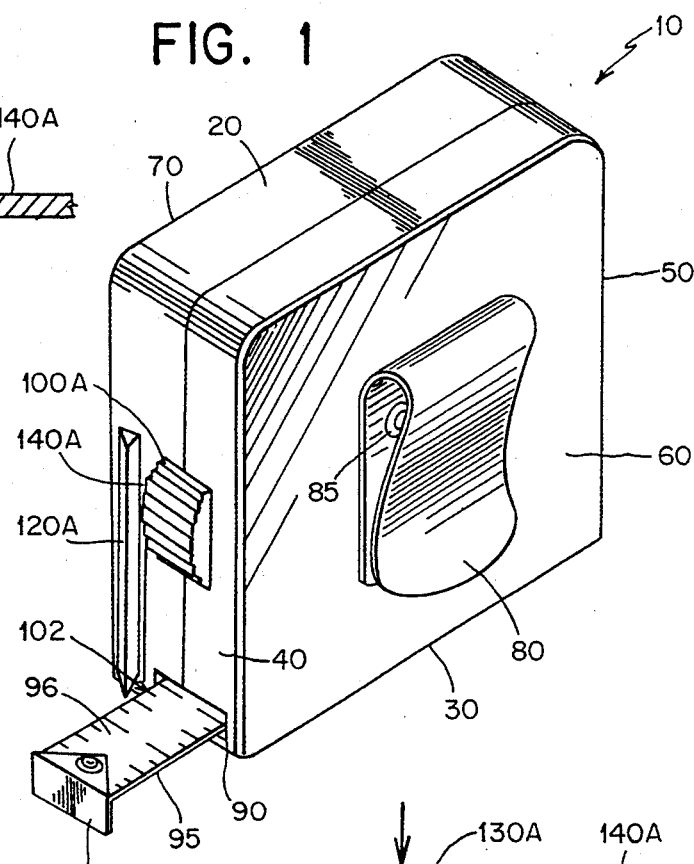
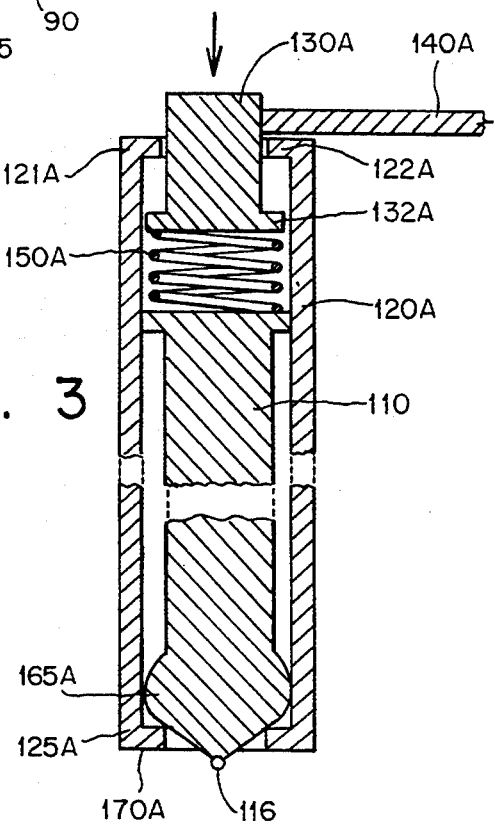

TAPE MEASURE AND MARKING DEVICE

BACKGROUND OF THE INVENTION

This invention relates to measuring devices. More particularly, it relates to a tape measure having a marker attached to its case body for precisely marking a measurement.

THE PRIOR ART

U.S. Pat. No. 3,526,964 to Clark, discloses a flexible measuring tape comprising a blade or tape coiled in a case for storage and which may be withdrawn selective distances for use. The flexible measuring tape has an adaptor on the housing, holding a scribe and an indicator at coincident points relative to the calibration of the tape. Attached to the body of the tape measure, the marker is situated below the opening for the flexible tape measure. At the opposite end, the extended tape measure has a pin for holding the end in place on the measured material.

U.S. Pat. No. 3,524,273 to Shore discloses a measuring tape and rewind spring which are joined as a convoluted winding in a container, having a transparent side wall. A display disc is disposed between the convoluted winding and side wall. The disc spins due to lateral contact with the convoluted winding when the tape is pulled out and rewound. After spinning, the disc comes to rest in a random position. Artwork on the spinning disc provides animated effects especially where there are markings on both the disc and the wall of the container.

U.S. Pat. No. 3,713,603 to Shore, discloses a measuring tape with a wind up spring equipped with an arresting device that can be used to prevent automatic wind up. No moving parts are involved and the user can readily adjust the extended length of tape without releasing the arresting device.

English patent 1,292,770 to West, discloses a coilable rule of free hub design. The coilable measuring blade and the recoil spring are factory preassembled on a hub in a pretensioned state so that they may be field assembled in the casing in proper adjustment without the use of special tools or assembly techniques.

French Patent No. 1,348,499 to Gay et al., discloses a tape measure which can be coiled and uncoiled from a housing. The tape measure has a loop at the end for hooking onto with nails and other extensions.

None of the references of the prior art disclose a tape measuring device having a locking mechanism attached to a marking device. In addition, none of the references contain a measurement arrow relating the marking point with a point on the tape measure. Furthermore, none of the references have a both a marking means and a metal scribe located on the measurement device.

SUMMARY OF THE INVENTION

Accordingly, the present invention provides a tape measuring device having a main housing with three sets of substantially parallel, opposite spaced sides. The first set of sides includes front and back sides, the second set has top and bottom sides, and the third set has left and right sides. The main housing encloses a coiled flexible measuring tape with its free end extendable therefrom and calibrated to measure in standard increments.

The measuring device contains a locking mechanism located on the front side of the main housing. The measuring tape is locked in place when the locking mechanism is pressed and moved towards the bottom side in a manner parallel with the front side. In addition, a marker, is located on the front side, and is attached to the locking mechanism. When the locking mechanism is displaced towards a locked position, the marker moves so as to extend beyond the bottom of the main housing, into a position available for writing. When the locking mechanism is released in the direction towards the top side, the marker moves back into its original retracted position.

In a further embodiment of the invention, the marking device has two locking mechanisms which move separately from each other. These locking mechanisms each connect to a separate housing so that the marker is inside one marker housing and a metal scribe is inside the scribe housing.

It is therefore an object of the invention to provide an apparatus which can lock and mark a specific measured spot. It is a further object of the invention to provide a measuring apparatus with a retractable marker.

It is still a further object of the invention to provide a tape measure for marking and scribing objects which is simple in design easy to manufacture and reliable in operation.

BRIEF DESCRIPTION OF THE DRAWINGS

Other objects and features of the present invention will become apparent from the following detailed description considered in connection with the accompanying drawings which disclose the embodiments of the present invention. It should be understood however, that the drawings are designed for the purpose of illustration only and not as a definition of the limits of the invention.

In the drawings, wherein similar reference characters disclose similar elements throughout the several views;

FIG. 1 shows a perspective view of the measuring device;

FIG. 2 is a cross sectioned view of the spring loaded marker;

FIG. 3 is a cross sectioned view of the spring loaded marker in marking position;

DETAILED DESCRIPTION OF THE PREFERRED EMBODIMENTS

Figure 4:
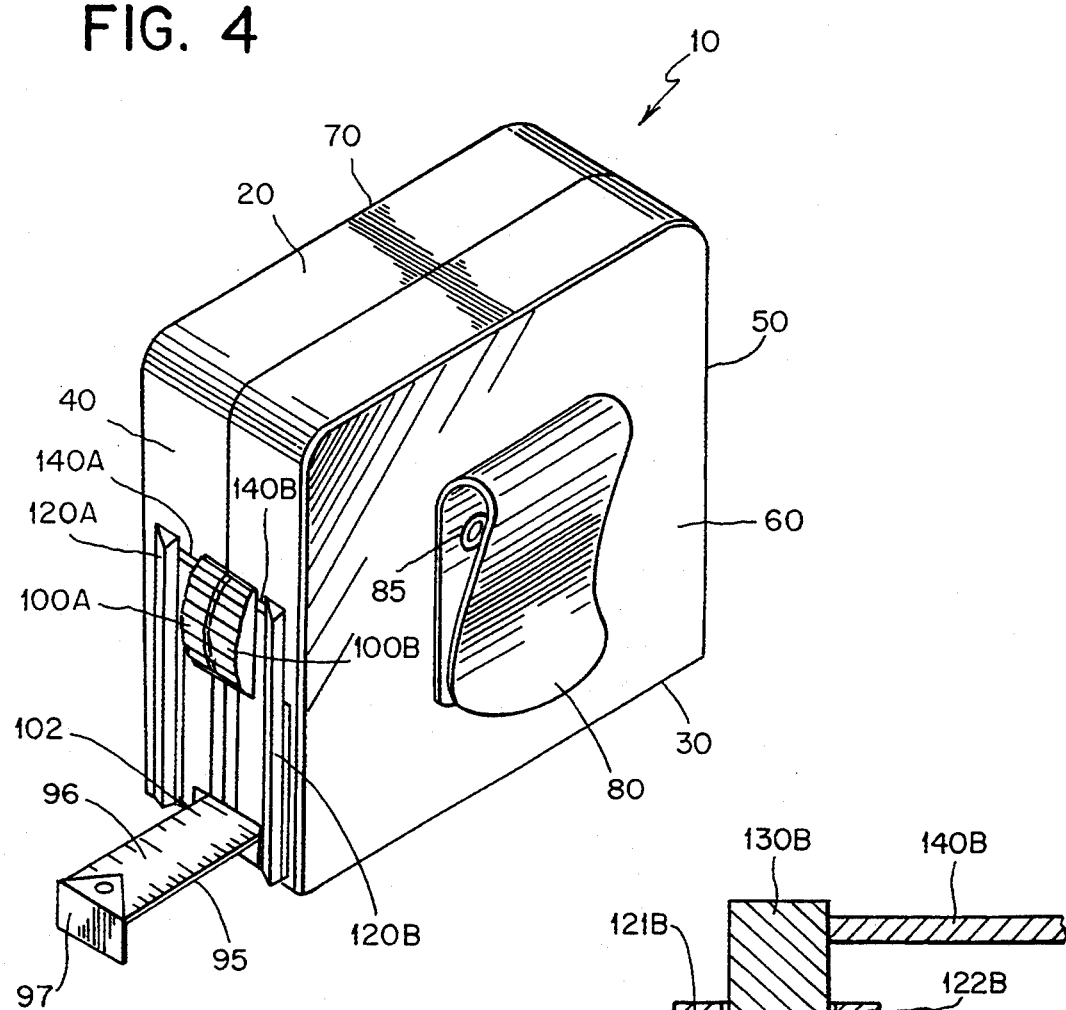
FIG. 4 is a perspective view of a second embodiment of the measuring device; and, FIG. 5 is a cross sectioned view of a spring loaded scribe.

Referring to FIG. 1 there is shown a measuring device 10 having a main housing with three sets of parallel spaced sides. The main housing has a top side 20 with a parallel spaced bottom side 30. The front side 40 has a complementary substantially parallel spaced, back side 50. The right side 60 is spaced substantially parallel to and opposite, left side 70. A buckle clip 80 is fixably attached to right side 60 with rivet 85. On the front side 40 of the measuring device 10, an opening 90 is provided for tape measure 95. Tape measure 95 has an end piece 97 riveted to the end thereof and substantially perpendicular to tape measure 95. The top face 96 of tape measure 95 has markings denoting measurement lengths. The measurement calibration starts at end piece 97 and increases in measurement therefrom.

Locking mechanism 100a is slidably attached to front side 40. Locking mechanism 100a extends down inside the main housing to the top face 96 of the measuring tape 95. When pressed down, a portion of the locking mechanism 100a presses into the top face 96 of measuring tape 95 to stop the tape movement. This type of locking mechanism is well known in the art. A marking means consisting of a spring loaded marker 110 is slidably attached to front side 40, and linked to locking mechanism 100a through lever arm 140a. This marker 110 has a tip which is preferably a graphite pencil or ball point pen for marking the desired material.

In addition, a measurement arrow 102 is located on the front side 40 of the marking device 10. This measurement arrow 102 points to a precise spot on the measuring tape 95 which corresponds to the position of the tip 116 of marker 110. The user can then look at the tape measure 95 and know the length noted by the marker 110.

In FIG. 2, spring loaded marker 110 is in a first position, located within marker housing 120a. Marker housing 120a has two ends, the top end 121a of marker housing 120a consists of an opening with ridge 122a on either side. Inside the top end 121a, there is provided a movable plunger 130a with flared end 132a which rests inside marker housing 120a and slides up and down within the marker housing 120a. Flared end 132a and ridge 122a slidably retain hold movable plunger 130a within marker housing 120a. Movable plunger 130a is attached to lever arm 140a which connects to locking mechanism 100a. Spring means 150a is attached to the bottom end of movable plunger 130a. The other end of spring means 150a is fixed to the top end of marker 110. This spring means 150a can be a coiled compression spring. At the bottom end 125a of marker housing 120a, an opening provides a means for the marking tip 116 to move outside of marker housing 120a and into marking position. Inside marker housing 120a, near the bottom end, 125a marker 110 has flared out region 165a. When marker 110 is pushed down and out of marker housing 120a, the flared out region 165a comes in contact with ridges 170a at bottom end 125a of marker housing 120a. Flared region 165a and ridges 170a prevent marker 110 from extending too far beyond marker housing 120a.

In operation, the user presses the locking mechanism 100a down, driving movable plunger 130a down into spring means 150a which extends the marking tip 116 of marker 110 to emerge out of marker housing 120a allowing a mark to be made.

FIG. 3 shows marker 110 in a second position, pushed outside marker housing 120a. Marking tip 116 is exposed allowing marking of desired material. When this locking mechanism 100a is pushed farther down, flared region 165a contacts ridges 170a causing marker 110 to remain fixed and forcing spring means 150a to contract, allowing for the locking mechanism to move into its locking position without moving marker 110 any further.

When locking mechanism 100a is released from locking position, spring means 150a expands, driving plunger 130a and locking mechanism 100a in an upward direction. When locking mechanism 100a is moved back to its original position, marker 110 retracts inside marker housing 120a to shield marking tip 116.

Locking mechanism 100a is incorporated with spring means 150a to allow the user to mark portions of varying length on measured material. If the locking mechanism 100a is down but not in a locked position, the user can mark measured material and then easily change measurement by extending the tape, and mark another point on the measured material. In addition, if the user wanted to make multiple markings of the same length, he could push the marker farther down, into its locked position and then use the device to mark multiple locations.

In a further embodiment, as shown in FIG. 4, the front side 40 of the measuring device 10 has two locking mechanisms 100a and 100b. These locking mechanisms are slidably attached to the front side 40 with locking mechanism 100a connecting to lever arm 140a and locking mechanism 100b connecting to lever arm 140b. Lever arm 140b extends to movable plunger 130b inside scribe housing 120b. Inside the scribe housing 120b, is a metal scribe 200. The metal scribe 200 rests inside scribe housing 120b using the same mechanics as the previous embodiment.

Figure 5:
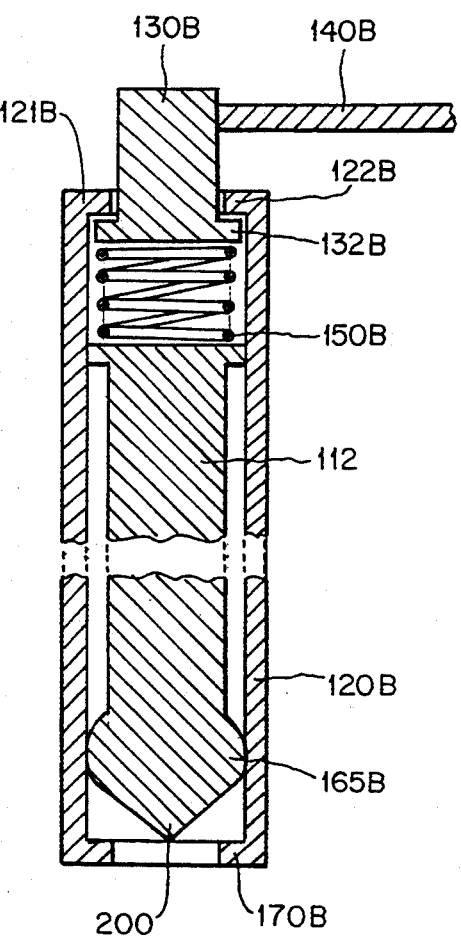

FIG. 5 shows metal scribe 200 resting inside scribe housing 120b. The metal scribe 200 is attached to spring means 150b with the spring means attached to movable plunger 130b. Preferably, scribe 200 is a hardened steel tip for scribing assorted metals. Lever arm 140b connects movable plunger 130b to locking mechanism 100b. Movable plunger rests inside scribe housing 120b extending through top end 121b. Flared point 132b and ridges 122b interact to keep movable plunger 130b inside scribe housing 120b. In addition flared ends 165b and ridges 170b on the scribe housing 120b keep the bottom end of the scribe 200 inside the scribe housing 120b.

While only two embodiments of the present invention have been shown and described, it is to be understood that many changes and modifications may be made thereunto without departing from the spirit and scope of the invention as defined in the appended claims.

What is claimed is:

1. A tape measure in combination with a marker and a scribe for measuring and marking material, the tape measure comprising:
    a coiled measuring tape;
    a first sliding locking mechanism and a second sliding locking mechanism for pressing against the tape measure to lock it in place;
    a marker located on one side of the measuring tape and a scribe located on the opposite side of the measuring tape;
    a lever arm connected to each of said locking mechanism, a marker plunger connected to one of said lever arms and a scribe plunger connected to the other of said lever arms; and
    a marker spring flexibly connecting said marker to said marker plunger and a scribe flexibly connecting said scribe to said scribe plunger;
    wherein said marker and said scribe are movable separately and independently from each other by selectively depressing said first and second sliding locking mechanisms to lock said tape measure in place and mark the material.

2. The device as claimed in claim 1, further comprising:
    a measurement arrow pointing to the measuring tape and corresponding to a measurement point defined by said marker and scribe.

3. The device as claimed in claim 2, wherein the marker is a pencil.

4. The device as claimed in claim 2, wherein the marker is a pen.

* * * * *

UNITED STATES PATENT AND TRADEMARK OFFICE
CERTIFICATE OF CORRECTION

PATENT NO.   : 5,435,074
DATED        : July 25, 1995
INVENTOR(S)  : Michael HOLEVAS ET AL It is certified that error appears in the above-identified patent and that said Letters Patent is hereby corrected as shown below:

Title page, item 76, line 1, delete "299th St." and insert --229th St.--.

Signed and Sealed this

Tenth Day of October, 1995

Attest:

BRUCE LEHMAN

Attesting Officer

Commissioner of Patents and Trademarks